3,291,802
2,3- AND 2,6-DICHLOROPYRAZINE BY
CHLORINATION
Kenneth Henry Collins, North Plainfield, N.J., assignor to
American Cyanamid Company, Stamford, Conn., a corporation of Maine
No Drawing. Filed Aug. 30, 1965, Ser. No. 483,872
13 Claims. (Cl. 260—250)

This is a continuation-in-part of applications Serial Numbers 395,320; 395,306 and 395,282, all filed September 9, 1964, all abandoned in favor of the present application.

This invention relates to a process for the chlorination of 2-chloropyrazine to 2,6-dichloropyrazine and 2,3-dichloropyrazine by the direct chlorination of 2-chloropyrazine with chlorine in a solvent catalyst controlling hydronium ion concentration to direct chlorination towards preferred isomers; particularly using a lower dialkylacid amide as solvent, and phosphorous oxychloride to control moisture, and hence hydronium ion concentration; the invention also covers the in situ synthesis of the 2-chloropyrazine. One preferred solvent in a dialkylamide of the formula:

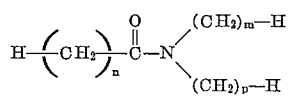

where $n$ is a small whole number not greater than 1 nor less than 0, and each of $m$ and $p$ are small whole numbers not less than 1 nor greater than 2.

The reaction may be expressed:

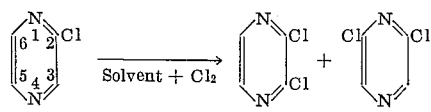

2,3- and 2,6-dichloropyrazines are useful as intermediates in the preparation of sulfa drugs, such as are disclosed in United States Patent 2,475,673, E. H. Northey and J. S. Webb, "Aminobenzenesulfonamidohalopyrazines and Methods of Preparing Same," July 12, 1949.

2-chloropyrazine is described and claimed in United States Patent 2,396,066, P. S. Winneck, "Preparation of 2-Chloropyrazine," March 5, 1946.

The production of 2-chloropyrazine from 2-hydroxypyrazine by reaction with phosphorus oxychloride is described in "The Preparation of Hydroxypyrazines and Derived Chloropyrazines," G. Karmas and P. E. Spoerri, J. Am. Chem. Soc. 74, 1580 (1952); and also B. Klein and P. E. Spoerri, J. Am. Chem. Soc. 73, 2949 (1951) at 2951.

The conversion of 2-sulfanilamido-3-chloropyrazine (disclosed in United States Patent 2,475,673) to 3-methoxysulfapyrazine is disclosed in United States Patent 3,098,069, B. Camerino and G. Palamidessi, "Pyrazine Derivatives," July 16, 1963.

Prior art methods of preparing dihalopyrazines have been undesirably complex and expensive. The reaction of chlorine with pyrazine in the liquid phase to form chloropyrazines presented special problems since under such conditions, decomposition takes place to a serious degree and useful products may not be obtained.

Several methods are known for the preparation of chloropyrazines involving vapor phase reactions at high temperatures and either atmospheric or super-atmospheric pressure conditions, whereby mixtures are obtained. United States Patent 2,524,431, J. K. Dixon, A. A. Miller and J. F. Bruesch, "Isomeric Polychloropyrazines and Preparation Thereof," October 3, 1950, discloses chlorination of pyrazines at 325° to 500° C., to yield mixed dichloropyrazines, among other products.

United States Patent 2,573,268, A. A. Miller, "Dichloropyrazines and Process of Preparing Same," October 30, 1951, discloses producing polychloropyrazines from monochloropyrazine at from 325° to 525° C.

United States Patent 2,540,476, J. K. Dixon and A. A. Miller, "Method of Separating Dihalogenopyrazines," February 6, 1951, discloses separation of isomeric dichloropyrazines. Although pyrazine itself is quite reactive in the presence of chlorine, 2-chloropyrazine is quite unreactive in the presence of chlorine and it was not considered possible to convert 2-chloropyrazine to a dichloro compound by a direct halogenation in the liquid state without using rather severe conditions of pressure and temperature. Also, when such chlorination is effected, a mixture of isomers usually results so that the preparation and isolation of any one isomer in a reasonable yield may not be accomplished economically.

A method for the preparation of 2,6-dichloropyrazine by chlorination of 2-chloropyrazine with chlorine or sulfuryl chloride in the liquid phase at 65° to 150° C. under pressures of 50 to 1,000 pounds per square inch (p.s.i.) is disclosed in United States Patent 2,797,219, W. E. Taft, "Method of Preparing 2,6-Dichloropyrazine," June 25, 1957.

In such a process, an autoclave is required, so a convenient tool is a 50 gallon autoclave, with a 180 pound batch. However, because of the corrosive nature of the reactants, the autoclave liner must be replaced frequently. The product must be steam distilled for satisfactory purity.

The difficulty of chlorinating pyrazines is recognized in the art, as shown by such patents as 3,096,331, W. K. Langdon and M. Kokorudz, "Chlorination of Alkylpyrazines," July 2, 1963. Only monochlorination is described.

Chlorination of non-analogous compounds in dimethylformamide is disclosed in articles such as R. Adams and R. R. Holmes, "Quinone Diimides," J. Am. Chem. Soc., 74, 3033 (1952). Du Pont has released a Technical Bulletin entitled "A Review of Catalytic and Synthetic Applications for Dimethylformamide."

The present invention is based on the discovery that 2-chloropyrazine is easily chlorinated to dichloropyrazine by a direct chlorination in the liquid phase at atmospheric pressure under very mild temperature conditions when the chlorination is carried out in a solvolytic and catalytic vehicle.

The presence of a polar solvent, which in the presence of water induces protonation of water to form hydronium ion ($H_3O^+$) appears to be an essential requirement. Hence the polar solvent must dissolve, or be miscible with, water for best performance. Miscibility with water is desired so that in purification, the solvent may be diluted out with water, leaving behind the polychlorinated pyrazines. If an effective concentration of hydronium ion is present, over about 2 mole percent, based on the molar quantity of chloropyrazine, substitution towards 2,6-dichloropyrazine is favored; if a minimal hydronium ion concentration exists, the 2,3-dichloropyrazine orientation is favored.

Dimethylformamide, diethylformamide or dimethylacetamide are preferred solvents. Dimethylformamide is usually the most economical. Where commercially available at competitive prices, solvents may be used which are partially halogenated, and/or in which an alkyl group is linked to form a ring.

In addition to the dialkylacidamides, other polar solvents, miscible with water, which give good chlorination of chloropyrazine include lower alcohols such as ethanol and methanol, acetic acid, acetic anhydride, acetonitrile, other lower water soluble fatty acids, their anhydrides, and nitriles, which dissolve water, and are dissolved in water, pyridine, picolines, including the alpha, beta and amma picolines and their mixtures, lutidines, other alkyl substituted picolines, other water-soluble nitrogenous ases, dimethyl sulfoxide, and sulfolane.

The degree and orientation of substitution is affected y moisture, temperature and acidity. Commercial hloropyrazine is a liquid which tends to absorb water rom the ambient air, so in the absence of special preautions, from about 2% to about 4% water content ; to be expected. Unless otherwise specified, such is he starting material of the examples. As chlorine adds o the 2-chloropyrazine, hydrogen chloride is eliminated, nd the acid thus formed reacts with water present. The esults obtained are consistent with the theory that proonation of water occurs with the formation of hydroium ions ($H_3O^+$), which seems to interact with the yrazine nucleus to shift substitution towards the 2,6-ichloropyrazine isomer. If the amount of water is reuced, substitution in both the 3 and 6 position occurs to ield 2,3- and 2,6-dichloropyrazine. The water can be emoved by conventional dehydrating procedures. Conveniently, water is removed by adding phosphorus oxyhloride ($POCl_3$), which reacts with water and removes he water from the reaction mixture. An excess of hosphorus oxychloride is so effective in removing water hat it appears to act as a catalyst to induce 2,3-substituion. It is easy to postulate theoretical mechanisms scribing a catalytic effect, or substitution directing inuence to the phosphorus oxychloride; or to ascribe its ffect in excess of the quantity theoretically necessary to eact with water present to a mass action effect which hore completely removes water, and hydronium ions, which have the 2,6-directing influence. This invention ; not postulated on either of these theories, or if yet nother mechanism is involved, is not essential to a lescription.

A reaction temperature of about 40° C. to 120° C. is iseful with 60° C. to 80° C. being preferred. Lower emperatures give good yields, but extend the time for eaction. Higher temperatures cause loss of reagents, or complicate control of the reaction. A temperature pelow reflux is preferred. An autoclave and higher emperatures may be used, if equipment is available, particularly for very volatile solvents.

An increase in temperature and chlorine availability end towards the production of 2,3,5-trichloropyrazine or even a completely chlorinated product. These products, too, can be produced, as described, by increasing chlorine availability, and forcing the reaction.

Dehydration of the solvent, and hence shift towards he 2,3-isomer is readily obtained by adding sulfuryl chloride, as the sulfur dioxide ties up any water, with ffective dehydration. It is itself a solvent, and the chlorine is used as a source of part or all of the chlorine for chlorination.

The reaction is preferably carried out at a temperature etween about 50 and 90° C. and preferably at about 70° to 75° C. At least about 0.3 mole of a dialkylacidmide, and preferably about one mole dimethylformmide is used per mole of 2-chloropyrazine most economically. From about 1 to 2 moles of sulfuryl chloride er mole of 2-chloropyrazine are used and preferably bout 1.8 moles.

Good yields of about 60% and more of 2,3-dichloropyrazine are obtained. The 2,3-dichloro isomer is ormed almost exclusively and in a typical run, the product consisted of about 95% 2,3-dichloropyrazine with he remainder being a mixture of 2,6-dichloropyrazine and 2-chloropyrazine.

Acetic anhydride can be used to remove water from he system.

Various mixtures of solvents and dehydrating agents nay be used; however, operations are usually simpler f only one liquid vehicle and one dehydrating agent re used.

A further feature of the process of the invention is the very convenient use of 2-hydroxypyrazine or a metallic salt, such as the sodium salt thereof, as a starting material. This may be chlorinated with phosphorus oxychloride to 2-chloropyrazine and in the presence of the phosphorus oxychloride from the first step the 2-chloropyrazine without isolation may be converted simply and easily to 2,3-dichloropyrazine.

2-chloropyrazine itself may be used as the starting material, but for practical preparations on a commercial scale, it is convenient and economical to start with 2-hydroxypyrazine in the form of its sodium derivative and react this with phosphorus oxychloride; the phosphorus oxychloride is used both as a solvent and as a reactant using from about 1.5 to 4 moles of phosphorus oxychloride per mole of hydroxypyrazine and preferably about 2.5 moles. The reaction temperature for the chlorination of hydroxypyrazine is conveniently the reflux temperature of the mixture which is about 100° to 108° C. The chlorination can be readily effected at temperatures below the reflux temperature, although more time is required. After the initial chlorination is complete, the 2-chloropyrazine in the reaction mixture containing excess phosphorus oxychloride and other products is reacted without isolation with chlorine in the presence of the solvolytic and catalytic vehicle for conversion to 2,3-dichloropyrazine.

It is most surprising that such excellent results may be obtained in view of the prior belief that vigorous conditions are necessary to effect chlorination.

The use of dialkylacidamide as a solvolytic and catalytic liquid vehicle is an important feature.

The preferred range of the vehicle, preferably dimethylformamide is from a minimum of about 0.3 to about 2 moles per mole of chloropyrazine. A larger amount may be used, but it is uneconomical. With less than 0.3 mole, the mixture becomes hard to handle, and markedly less efficient.

At least stoichiometric amounts of chlorine must be used. Chlorine is simply passed into the reaction mixture. Because of a mild reaction exotherm, slight cooling may be needed. When no more heat is evolved, the temperature drops and the reaction is essentially completed. At least part of the chlorine may be added to the polar liquid solvent before the addition of the 2-chloropyrazine.

While directed to chlorination as the commercially important embodiment, analogues procedures can be used for bromination of pyrazines.

The invention is further illustrated by the examples which follow, in which all parts are by weight unless otherwise specified. Where mole percents are specified, it is on the basis of the amount of chloropyrazine in the system.

*Example 1*

Chlorine is bubbled for 10 minutes into 64.6 parts of dimethylformamide, held between 70 and 75° C. Then 202 parts of 2-chloropyrazine is added gradually over a 15 minute period. The addition of chlorine is continued, meanwhile, while holding the temperature between 70 and 75° C. by cooling. When the mild exotherm ceases and the reaction mixture temperature decreases to about 60° C., the reaction is considered complete. The mixture is allowed to cool to 40° C., then is poured onto a slurry of 220 parts of ice and 135 parts water, with stirring. The solid 2,6-dichloropyrazine is removed by filtration and washed with water. A 90% yield of 2,6-dichloropyrazine is obtained.

*Examples 2 to 6*

The procedure of Example 1 was repeated varying the amounts of dimethylformamide (DMF) and 2-chloropyrazine. The reactions were run at 70 to 75° C. using excess chlorine. The results are shown below:

| Ex. | Gram-Moles 2-Chloro-pyrazine | Gram-Moles DMF | Ratio DMF to 2-Chloro-pyrazine | Yield in Grams | Theory | Percent Yield |
| --- | --- | --- | --- | --- | --- | --- |
| 2 | 0.28 | 0.28 | 1.0 | 33 | 41.6 | 80 |
| 3 | 0.56 | 0.64 | 1.07 | 80 | 83 | 96 |
| 4 | 0.28 | 0.14 | 0.50 | 35 | 41.6 | 84 |
| 5 | 0.28 | 0.323 | 1.08 | 36.4 | 41.6 | 87 |
| 6 | 0.42 | 0.28 | 0.66 | 55 | 63 | 87 |

*Example 7*

The procedure of Example 1 was followed using 0.37 mole 2-chloropyrazine and 0.425 mole DMF except that the chlorination temperature was held between 100 and 108° C. The product obtained was a mixture of 2,3-dichloropyrazine and 2,6-dichloropyrazine, as shown by infrared curves.

These were separated by differential crystallization based on the differences of their respective setting points.

*Example 8*

The procedure of Example 1 was followed using 0.28 gram moles of 2-chloropyrazine and 0.323 gram moles of DMF except that the chlorination was carried out at 90 to 100° C. A closed reactor under 25 pounds per square inch gage was used to decrease the volatilization of the product and stripping by the exit gases.

The product obtained consisted of 16.5 g. solid crystalline material, 80%, 2,6-dichloro compound and 20% 2,3-compound; and 11.2 g. oil made up of about equal parts of 2,3- and 2,6-dichloro isomers.

Where separated by fractional crystallization the yields were:

2,6-isomer _____ 18.8 grams or 45%
2,3-isomer _____ 8.9 grams or 21%

*Example 9*

12.7 parts of 2-chloropyrazine was dissolved in 9.45 parts of dimethylacetamide and the mixture held between 70 and 75° C., with slight cooling as necessary. Chlorine gas was then bubbled through the mixture until heat was no longer evolved. The reaction mixture was poured into 100 parts of half ice and half water with stirring and the crystalline product isolated by filtration and washed with water. A yield was obtained of 8.5 parts of 2,6-dichloropyrazine which analyzed 91.6% pure 2,6-dichloropyrazine by infrared analysis, the remainder being principally water.

Similar results are obtained using diethylformamide as the solvent.

*Example 10*

To a solution of 32 parts of 2-chloropyrazine in 23.6 parts of dimethylformamide at 70 to 75° C. is added gradually, with stirring, 67 parts of sulfuryl chloride. The temperature is maintained at 70 to 75° C. with external cooling as needed. After the reaction is complete, as indicated by the cessation of evolution of heat, the mixture is cooled below 40° C. and 100 parts of water is added cautiously to the reaction mixture while keeping the temperature below 40° C. The pH of the mixture is adjusted to between about 7.0 and almost to 8.0 by the addition of sodium hydroxide solution. The product 2,3-dichloropyrazine is distilled from the reaction mixture.

The organic layer is isolated, giving 26 parts of 2,3-dichloropyrazine (62.5% yield) identified by its infrared spectrum.

The run is repeated with each of diethylformamide and dimethylacetamide, and in the same molar ratios. Good yields of 2,3-dichloropyrazine are obtained.

*Example 11*

The temperature of 1130 parts of phosphorus oxychloride is maintained at 25 to 30° C. while slowly adding 400 parts of sodium pyrazinolate over a 30 to 40 minute period. The addition is very exothermic and cooling is required. After a 15-minute stir period at 20 to 25° C. the mixture is cautiously heated to 90° C. An exothermic reaction occurs during the heating step. In larger vessels cooling may be required to control the exotherm. After the temperature levels off at 90° C. the mixture is further heated to 106° C. and stirred at 106° C. to 109° C. for 3 hours. The reaction mixture containing 2-chloropyrazine is cooled to 20° C. and 735 parts of dimethylformamide are cautiously added while holding the temperature at 20 to 25° C. The addition is very exothermic so cooling is required. The mix is stirred 15 minutes at 20 to 25° C. and then heated to 75° C. While holding the temperature at 70 to 75° C., chlorine gas is bubbled through the mixture until the mild exothermic reaction ceases and the temperature drops, without extra cooling, to 60° C. Then, after cooling to 25° C. the mixture is cautiously drowned into 500 parts of ice and water, maintaining the temperature at 25 to 30° C. with external acetone-Dry Ice cooling and flake ice internally.

The drowned reaction mixture is cautiously neutralized to pH 7.0 to 8.0 by the addition of 50% caustic soda solution. The neutralization is very exothermic and the temperature is maintained at 25° C. to 30° C. by means of external acetone-Dry Ice cooling. The product is removed from the mixture by steam distillation. The two-phase distillate is cooled and the lower layer of 2,3-dichloropyrazine is separated. A 70 to 75% yield is obtained.

In additional experiments under similar conditions yields of from 70% to 80% based on starting 2-hydroxypyrazine were obtained.

Diethylformamide and dimethylacetamide give good yields.

Outside of the preferred range 2-chloropyrazine may be used as the starting material, with from about 1 to 4 moles of phosphorus oxychloride and 0.3 to 2 moles of dimethylformamide, or other dialkylacidamide, and good yields of 2,3-dichloropyrazine obtained.

*Example 12*

A mixture of 5.0 moles of chloropyrazine containing 0.2 mole percent water and 2.5 moles of dimethylformamide is heated to 100° C. in a two-liter jacketed glass resin flask. Chlorine is bubbled gradually below the surface, maintaining a temperature range of 100–105° C. by means of water and steam. After 6.25 moles of chlorine is added, the reaction mixture is cooled to 60° C. and water added to a volume of 1.2 liters. The diluted reaction mixture is poured onto 500 grams of ice with stirring. The solid 2,6-dichloropyrazine is removed by filtration and washed with water. Vapor phase chromatography analysis of the solid cake indicated a 76% yield of 2,6-dichloropyrazine and 6.0% yield of 2,3-dichloropyrazine.

(In this and following examples, moles refers to gram moles unless otherwise clearly stated. Mole percentages are based on the chloropyrazine only.)

*Examples 13 through 16*

In each of these examples the number of moles of dimethylformamide, chloropyrazine and chlorine are the same as in Example 1. The solid cake obtained is analyzed by VPC for both 2,6- and 2,3-dichloropyrazine somer content. The variables used and yields obtained in each example are as follows:

| Ex. | Mole Percent of Chloropyrazine, of Water | Chlorination Temperature, °C. | Percent Yield, 2,6 Isomer | Percent Yield, 2,3 Isomer |
|---|---|---|---|---|
| 3 | 12.8 | 100–105 | 79.7 | 3.2 |
| 4 | 25.5 | 100–105 | 69.1 | 2.3 |
| 5 | 13.2 | 70–75 | 86.2 | 0.7 |
| 6 | 26.2 | 70–75 | 83.0 | 0.8 |

Example 17

A mixture of 5.0 moles of chloropyrazine containing .2 mole percent of water and 2.5 moles of dimethylformamide is heated to 70° C. in a two-liter jacketed resin flask. Chlorine is bubbled gradually below the surface, maintaining a temperature of 70–75° C. by means of tempered water. After 6.25 moles of chlorine is added, the reaction mixture is cooled to 60° C. and water added to a volume of 1.2 liters. The diluted reaction mixture is poured onto 500 grams of ice with stirring. The solid 2,6-dichloropyrazine is removed by filtration and washed with water. An oily layer containing 2,3 and 2,6 isomers is separated from the combined aqueous liquors. The cake and oily layer are analyzed by vapor phase chromatography. A 32.8% yield of 2,6-dichloropyrazine and 0.4% yield of 2,4-dichloropyrazine is obtained.

Examples 18 through 21

In each of these examples the number of moles of both chloropyrazine and chlorine is the same as in Example 17. The solid cake and oily layer are analyzed by vapor phase chromatography for 2,6- and 2,3-dichloropyrazine isomer content. The variables used and yields obtained in each example are as follows:

| Ex. | Mole Percent of Chloropyrazine, of Water | Moles of DMF | Chlorination Temperature, °C. | Percent Yield, 2,6 Isomer | Percent Yield, 2,3 Isomer |
|---|---|---|---|---|---|
| 3 | 6.5 | 2.5 | 70–75 | 49.0 | 33.2 |
| 9 | 0.2 | 2.5 | 40–45 | 73.2 | 11.6 |
| 10 | 0.4 | 5.0 | 70–75 | 33.5 | 57.1 |
| 11 | 13.1 | 5.0 | 70–75 | 66.6 | 18.5 |

Example 22

1.11 moles of phosphorus oxychloride is added slowly to a mixture of 1.0 mole of chloropyrazine and 1.15 moles of dimethylformamide containing 0.2 mole percent water, expressed on the basis of chloropyrazine, in a 2-liter (3-neck) round bottom flask. The exotherm is not allowed to exceed 65° C. The reaction mixture is heated to 70° C. Chlorine is bubbled gradually below the surface, maintaining a temperature range of 70–75° C. by means of external cooling and/or heating. After 6.25 moles of chlorine is added, the reaction mixture is cooled to 60° C. and poured slowly and carefully onto 500 ml. of ice water with stirring. The oily layer is separated from the aqueous layer at 35–40° C. Vapor phase chromatography of the oily layer indicated a 1.0% yield of 2,6-dichloropyrazine and an 84.3% yield of 2,3-dichloropyrazine.

Examples 23 through 27

In each of these examples the number of moles of both chloropyrazine and dimethylformamide is the same as in Example 22. The oily layer obtained is analyzed by vapor phase chromatography for 2,6- and 2,3-dichloropyrazine isomers. The variables used and yields obtained in each example are as follows:

| Ex. | Mole Percent of Water | Mole of POCl$_3$ | Moles of Chlorine | Chlorination Temperature, °C. | Percent Yield, 2,6 isomer | Percent Yield, 2,3 isomer |
|---|---|---|---|---|---|---|
| 23 | 0.4 | 0.2 | 1.25 | 70–75 | 1.8 | 87.4 |
| 24 | 13.0 | 0.2 | 1.25 | 70–75 | 4.1 | 91.0 |
| 25 | 0.2 | 2.0 | 1.25 | 70–75 | 0.7 | 84.2 |
| 26 | 0.2 | 1.11 | 2.4 | 70–75 | 1.1 | 87.4 |
| 27 | 0.2 | 1.11 | 2.5 | 100–105 | 3.4 | 69.4 |

Example 28

0.25 mole of phosphorus oxychloride is added slowly to a mixture of 5.0 moles of chloropyrazine and 5.75 moles of dimethylformamide containing 0.2 mole percent water in a 2-liter, jacketed glass resin flask. The exotherm is not allowed to exceed 65° C. Chlorine is bubbled gradually below the surface, maintaining a temperature of 70–75° C. After 6.25 moles of chlorine is added, the reaction mixture is cooled to 60° C. and cold water added slowly to a volume of 2.0 liters. The diluted reaction mixture is poured onto 500 grams of ice with stirring. The solid 2,3-dichloropyrazine is removed by filtration and washed with water. Vapor phase chromatography analysis indicated a 2.8% yield of 2,6-dichloropyrazine and an 82.7% yield of 2,3-dichloropyrazine.

Example 29

A mixture of 0.5 mole of chloropyrazine and 1.0 mole of acetic acid containing 27.8 moles percent water was heated to 90° C. in a 500 cc. three-necked flask. An excess of chlorine was bubbled through the mixture while a temperature of 90–97° C. was maintained. After cooling to 50° C. the mixture was poured onto 200 grams of ice, the solid collected by filtration and washed with ice water. Based on vapor phase chromatography analysis of the cake, the yields of dichloropyrazine were: 55.0% of 2,6-dichloropyrazine and 1.1% of 2,3-dichloropyrazine.

What is claimed is:

1. A process for the preparation of a dichloropyrazine which comprises reacting chlorine with 2-chloropyrazine in a polar organic solvent which is water soluble, in the ratio of at least 0.3 mole of said solvent per mole of 2-chloropyrazine, at a temperature of about 40° to 120° C., and having over about 0.02 mole percent, based on 2-chloropyrazine, of water present for orientation of the product towards the 2,6-dichloropyrazine isomer, and less than said 0.02 percent water for orientation of the product towards the 2,3-dichloropyrazine isomer.

2. The process of claim 1 in which the temperature is within the range of about 70° to 105° C.

3. The process for the preparation of a dichloropyrazine which comprises reacting chlorine with 2-chloropyrazine in the presence of at least 0.3 mole of dialkyl acid amide of the formula:

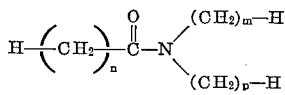

where *n* is a small whole number not greater than 1 nor less than 0, and each of *m* and *p* are small whole numbers not less than 1 nor greater than 2, for each mole of 2-chloropyrazine, at a temperature of about 40° C. to about 120° C.

4. The process of claim 3 in which the dialkyl acid amide is dimethylformamide.

5. The process of claim 3 in which the dialkyl acid is diethylformamide.

6. The process of claim 3 in which the dialkyl acid amide is dimethylacetamide.

7. A process according to claim 3 for the preparation of 2,6-dichloropyrazine where the reaction mixture has at least about 0.02 mole percent water therein.

8. A process for the preparation of 2,3-dichloropyrazine which comprises reacting at least one mole of chlorine with one mole of 2-chloropyrazine in the presence of at least 0.3 mole of lower dialkyl acid amide of the formula:

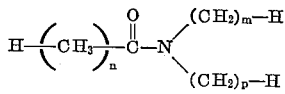

where *n* is a small whole number not greater than 1 nor less than 0, and each of *m* and *p* are small whole numbers not less than 1 nor greater than 2, and from about 0.05 to 4 moles of phosphorous oxychloride per mole of 2-chloropyrazine, at least enough phosphorous oxychloride being present to react with water in the system, at a temperature of about 40 to 120° C.

9. The process of claim 1 in which the dialkyl acid amide is dimethylformamide.

10. A process for the preparation of 2,3-dichloropyrazine which comprises reacting a pyrazine selected from the group consisting of 2-hydroxypyrazine, and the metal salts thereof, with from 1.5 to 4 moles of phosphorous oxychloride per mole of said pyrazine, adding to the reaction mixture at least 0.3 mole of a lower dialkyl acid amide of the formula:

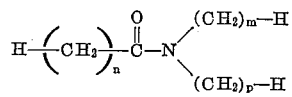

where *n* is a small whole number not greater than 1 nor less than 0, and each of *m* and *p* are small whole numbers not less than 1 nor greater than 2, per mole of said pyrazine, and adding at least one mole of chlorine per mole of pyrazine, at a temperature of about 40° C. to 120° C., and recovering 2,3-dichloropyrazine from the reaction mixture.

11. The process of claim 7 in which the dialkyl acid amide is dimethylformamide.

12. The process of claim 11 in which about 1.8 moles of sulfuryl chloride and about 1 mole of dimethylformamide are present per mole of 2-chloropyrazine.

13. A process for the preparation of a dichloropyrazine which comprises reacting chlorine with 2-chloropyrazine in a water-soluble polar organic solvent selected from the group consisting of dimethylformamide, diethylformamide, dimethylacetamide, diethylacetamide, lower alcohols, lower water-soluble fatty acids, lower water-soluble fatty acid anhydrides, lower water-soluble fatty acid nitriles, pyridine, alpha, beta and gamma picoline and mixtures thereof, the lutidines, dimethyl sulfoxide, and sulfolane, in the ratio of at least 0.3 mole of said solvent per mole of 2-chloropyrazine, at a temperature of about 40° to 120° C., and having over about 0.02 mole percent, based on 2-chloropyrazine, of water present for orientation of the product towards the 2,6-dichloropyrazine isomer, and less than 0.02 percent water for orientation of the product towards the 2,3-dichloropyrazine isomer.

References Cited by the Examiner

UNITED STATES PATENTS 2,797,219   6/1957   Taft _____ 260—250

NICHOLAS S. RIZZO, *Primary Examiner.*